United States Patent [19]

Kim

[11] Patent Number: 5,694,492
[45] Date of Patent: Dec. 2, 1997

[54] POST-PROCESSING METHOD AND APPARATUS FOR REMOVING A BLOCKING EFFECT IN A DECODED IMAGE SIGNAL

[75] Inventor: Sang-Ho Kim, Seoul, Rep. of Korea

[73] Assignee: Daewoo Electronics Co., Ltd, Seoul, Rep. of Korea

[21] Appl. No.: 431,880

[22] Filed: May 1, 1995

[30] Foreign Application Priority Data

Apr. 30, 1994 [KR] Rep. of Korea ............... 94-9477

[51] Int. Cl.$^6$ ............................................. G06K 9/36
[52] U.S. Cl. ................................... 382/262; 382/268
[58] Field of Search ............................... 382/233, 254, 382/262, 268, 275; 358/447, 463; 348/241, 607

[56] References Cited

U.S. PATENT DOCUMENTS

| | | | |
|---|---|---|---|
| 5,384,849 | 1/1995 | Jeong | 380/49 |
| 5,454,051 | 9/1995 | Smith | 382/233 |
| 5,495,538 | 2/1996 | Fan | 382/233 |

*Primary Examiner*—Andrew Johns
*Attorney, Agent, or Firm*—Anderson Kill & Olick, P.C.

[57] ABSTRACT

A post-processing method and apparatus is capable of improving the image quality of a decoded image signal by effectively reducing or removing a blocking effect in the decoded image signal. Decoded image data is first stored in a memory and target pixel data is filtered. Thereafter, an absolute difference value between original target pixel data and the filtered target pixel data is calculated and compared with a predetermined threshold value. The stored target pixel data is updated with the filtered target pixel data if the absolute difference value is smaller than the predetermined threshold value and is updated with compensated target pixel data if otherwise, wherein the compensated target pixel data is provided by adding the original target pixel data and the predetermined threshold value if the original target pixel data is smaller than the filtered target pixel data and by subtracting the predetermined threshold value from the original target pixel data if the original target pixel data is greater than the filtered target pixel data. The filtering process is repeated up to N times as long as the absolute difference value is smaller than the predetermined threshold value.

17 Claims, 4 Drawing Sheets

POST-PROCESSING METHOD AND APPARATUS FOR REMOVING A BLOCKING EFFECT IN A DECODED IMAGE SIGNAL

FIELD OF THE INVENTION

The present invention relates to a post-processing method and apparatus for use in an image signal decoding system; and, more particularly, to an improved method and apparatus capable of removing a blocking effect present at the boundary of a block of decoded image data by effectively post-processing the decoded image data, thereby improving the image quality of the system.

DESCRIPTION OF THE PRIOR ART

In various electronic/electrical applications such as high definition television and video telephone systems, an image signal may need be transmitted in a digitized form. When the image signal is expressed in the digitized form, there is bound to occur a large amount of digital data. Since, however, the available frequency bandwidth of a conventional transmission channel is limited, in order to transmit the image signal therethrough, the use of an image encoding system often becomes necessary to compress the large amount of digital data. Among various video compression techniques, the so-called hybrid coding technique, which combines temporal and spatial compression techniques together with a stastical coding technique, is known to be most effective.

Most hybrid coding techniques employ an adaptive inter/intra mode coding, othogonal transform, quantization of transform coefficients, RLC(run-length coding), and VLC (variable length coding). The adaptive inter/intra mode coding is a process of selecting a video signal for a subsequent othogonal transform from either PCM(pulse code modulation) data of a current frame or DPCM(differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce an error signal representing the difference between the current frame and its prediction. This coding method is described, for example, in Staffan Ericsson, "Fixed and Adapted Predictors for Hybrid Predictive/Transform Coding", *IEEE Transactions on Communications*, COM-33, No. 12, pp. 1291–1301 (December 1985); and in Ninomiya and Ohtsuka, "A Motion-compensated Interframe Coding Scheme for Television Pictures", *IEEE Transaction on Communications*, COM-30, No. 1, pp. 201–210 (January 1982), both of which are interpolated herein by reference.

The othogonal transform, which exploits the spatial correlationships between image data such as PCM data of the current frame or motion compensated DPCM data and reduces or removes spatial redundancies therebetween, converts a block of digital image data into a set of transform coefficients. This technique is described in Chen and Pratt, "Scene Adaptive Coder", *IEEE Transactions on Communications*, COM-32, No. 3, pp. 225–232 (March 1984). By processing such transform coefficient data with quantization, zigzag scanning, RLC, and VLC, the amount of data to be transmitted can be effectively compressed.

The encoded image data is transmitted through a conventional transmission channel to an image signal decoder included in an image signal decoding system, which performs an inverse process of the encoding operation to thereby reconstruct the original image data. The reconstructed image data nomally exhibits an annoying artifact such as a blocking effect wherein the border line of a block becomes visible at the receiving end. Such blocking effect occurs since a frame is encoded in units of blocks.

As is well known in the art, to improve the quality of the reconstructed image data or decoded image data, generally, the decoded image data is further processed by employing a post-processing filter. The prior art post-processing filter performs filtering of the decoded image data with a predetermined cutoff frequency to thereby enhance the quality of the decoded image data.

Since, however, the conventional post-processing is performed without due regard paid to individual filtered pixel data, such filtering may not substantially reduce the blocking effect at the boundary of a block or may generate distorted image data, thereby deteriorating the image quality.

SUMMARY OF THE INVENTION

It is, therefore, a primary object of the invention to provide a post-processing method and apparatus for use in an image signal decoding system capable of substantially reducing or eliminating the blocking effect present at the boundary of a block of decoded image data by effectively post-processing the decoded image data, thereby improving the image quality of the system.

In accordance with the invention, there is provided a method, for use in an image signal decoding system, for post-processing, on a pixel-by-pixel basis, decoded image data of a current frame from an image signal decoder included in the image signal decoding system, comprising the steps of:

(a) storing the decoded image data of the current frame in a memory;

(b) filtering target pixel data stored in the memory to provide filtered target pixel data, wherein the target pixel data represents a pixel value of a pixel to be filtered;

(c) calculating an absolute difference value between an original target pixel data and the filtered target pixel data, wherein the original target pixel data represents non-filtered target pixel data included in the decoded image data;

(d) updating the stored target pixel data with the filtered target pixel data if the absolute difference value is smaller than a predetermined threshold value;

(e) repeating said steps (b) to (d) N times as long as the absolute difference value is smaller than the predetermined threshold value and updating the stored target pixel value with compensated target pixel data if the absolute difference value is equal to or larger than the predetermined threshold value, wherein the compensated target pixel data is provided by adding the original target pixel data and the predetermined threshold value if the original target pixel data is smaller than the filtered target pixel data and by subtracting the predetermined threshold value from the original target pixel data if the original target pixel data is greater than the filtered target pixel data; and (f) repeating said steps (b) to (e) for a next target pixel until all the pixels in the current frame are post-processed.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
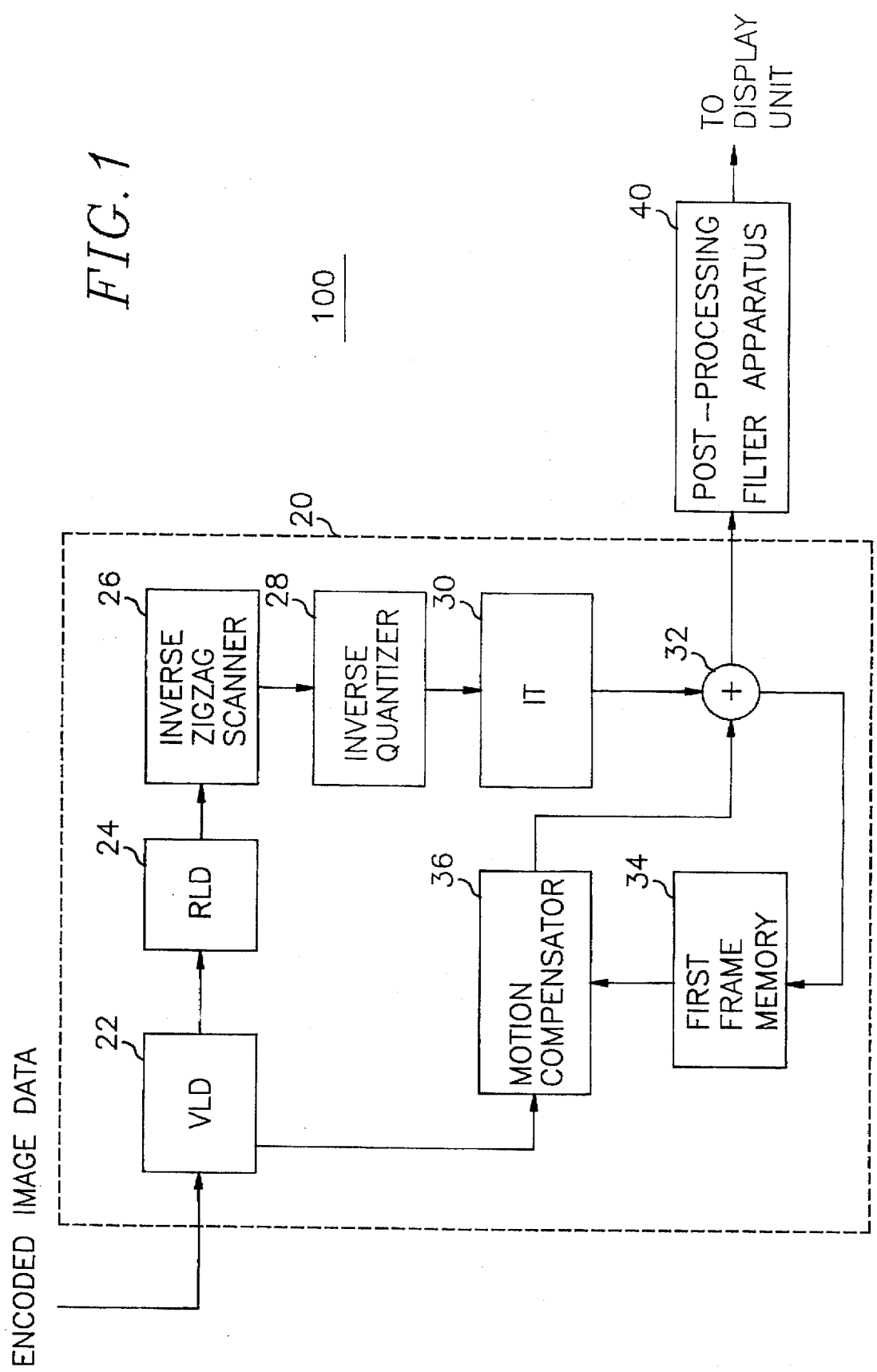
FIG. 1 shows a block diagram of an image signal decoding system.

Referring to FIG. 1, there is shown a novel image signal decoding system 100 of the present invention. The image signal decoding system 100 comprises an image signal decoder 20 and a post-processing filter apparatus 40, wherein the image signal decoder 20 includes a variable length decoder(VLD) 22, a run-length decoder(RLD) 24, an inverse zigzag scanner 26, an inverse quantizer 28, an inverse transformer(IT) 30, an adder 32, a first frame memory 34 and a motion compensator 36.

In the image signal decoder 20, encoded image data, i.e., a set of variable length coded transform coefficients and motion vectors is provided to the VLD 22 on a block-by-block basis. The VLD 22 serves to decode the set of variable length coded transform coefficients and the motion vectors to provide run-length coded transform coefficients to the RLD 24 and the motion vectors to the motion compensator 36, respectively. The VLD 22 is basically a look-up table: that is, in the VLD 22, a plurality of code sets is provided to define respective relationships between variable length codes and their run-length codes or motion vectors. Thereafter, the run-length coded transform coefficients are applied to the RLD 24, which is also a look-up table, for generating zigzag scanned transform coefficients. The zigzag scanned transform coefficients are then provided to the inverse zigzag scanner 26.

At the inverse zigzag scanner 26, the zigzag scanned transform coefficients are reconstructed to provide blocks of quantized transform coefficients. Each block of quantized transform coefficients is then converted into a set of transform coefficients at the inverse quantizer 28. Subsequently, the set of transform coefficients is fed to the IT 30, e.g., inverse discrete cosine transformer, which transforms the set of transform coefficients into a set of difference data between a block of a current frame and its corresponding block of a previous frame. The set of difference data is then sent to the adder 32.

In the meanwhile, the motion compensator 36 extracts a set of corresponding pixel data from the previous frame stored in the first frame memory 34 based on a motion vector, which corresponds to each block of the current frame, from the VLD 22 and provides the set of extracted pixel data to the adder 32. The set of extracted pixel data from the motion compensator 35 and the set of pixel difference data from the IT 30 are then summed up at the adder 32 to thereby provide reconstructed image data of a given block of the current frame. The reconstructed image data or decoded image data of the block is then applied to the first frame memory 34 for the storage thereof and to the post-processing filter apparatus 40.

At the post-processing filter apparatus 40 of the present invention, post-processing of the decoded image data from the adder 32 is carried out to effectively filter the decoded image data. The post-processed image data is transmitted to a display unit(not shown).

Figure 2:
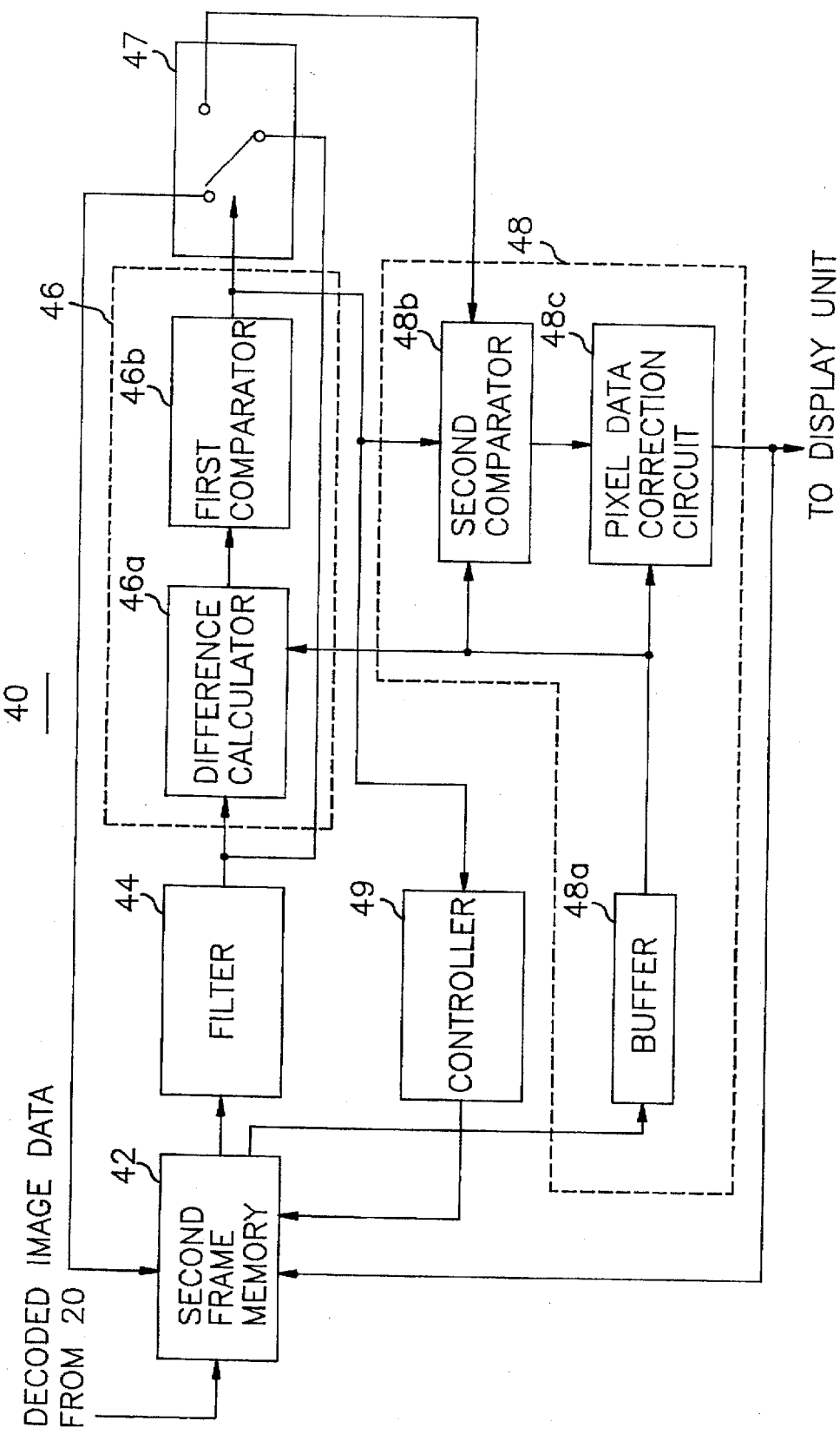
FIG. 2 represents a detailed block diagram of the post-processing filter apparatus of the present invention shown in FIG. 1.
Figure 3A:
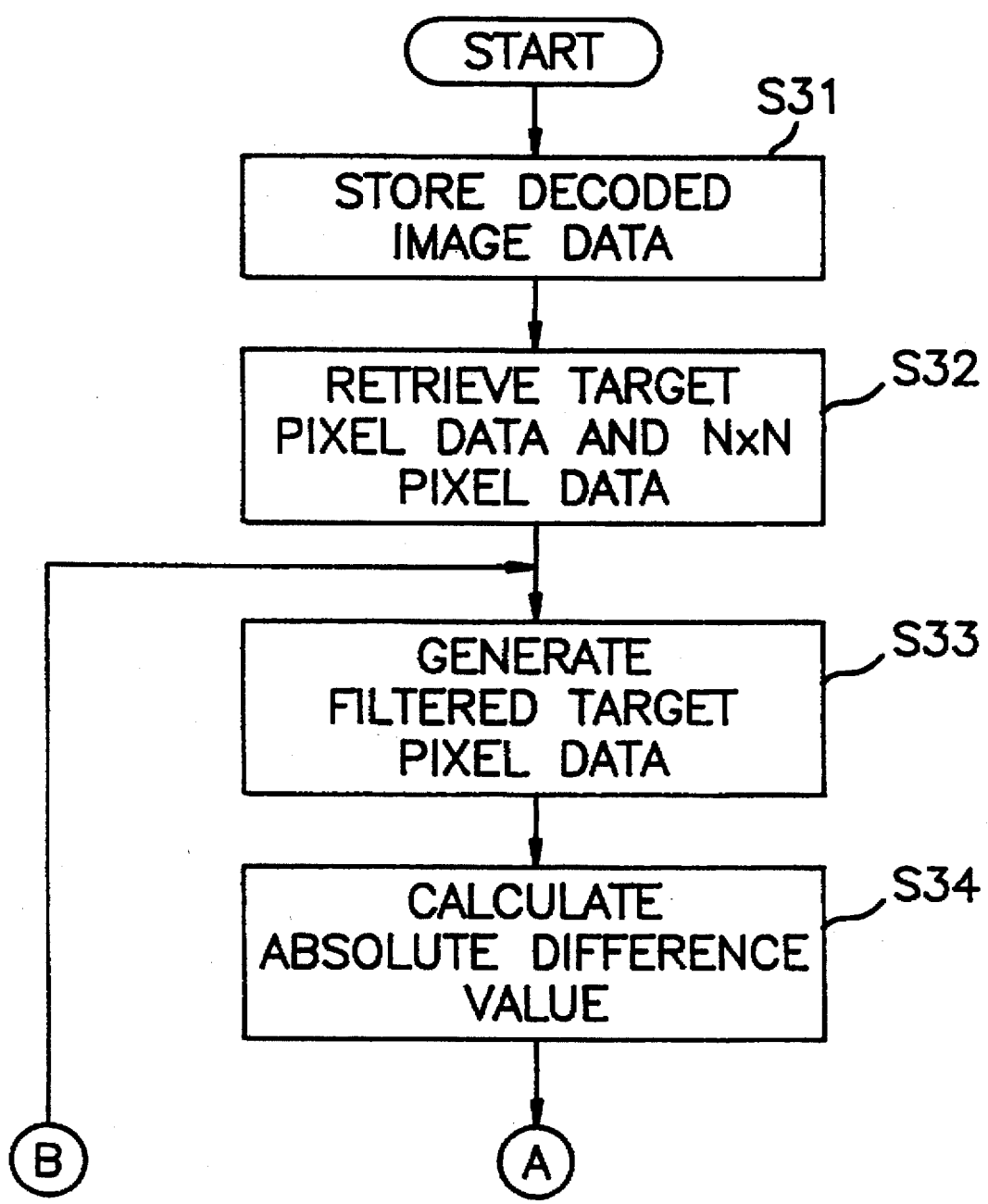
FIGS. 3A and 3B depict flow charts for describing the post-processing method in accordance with the present invention.
Figure 3B:
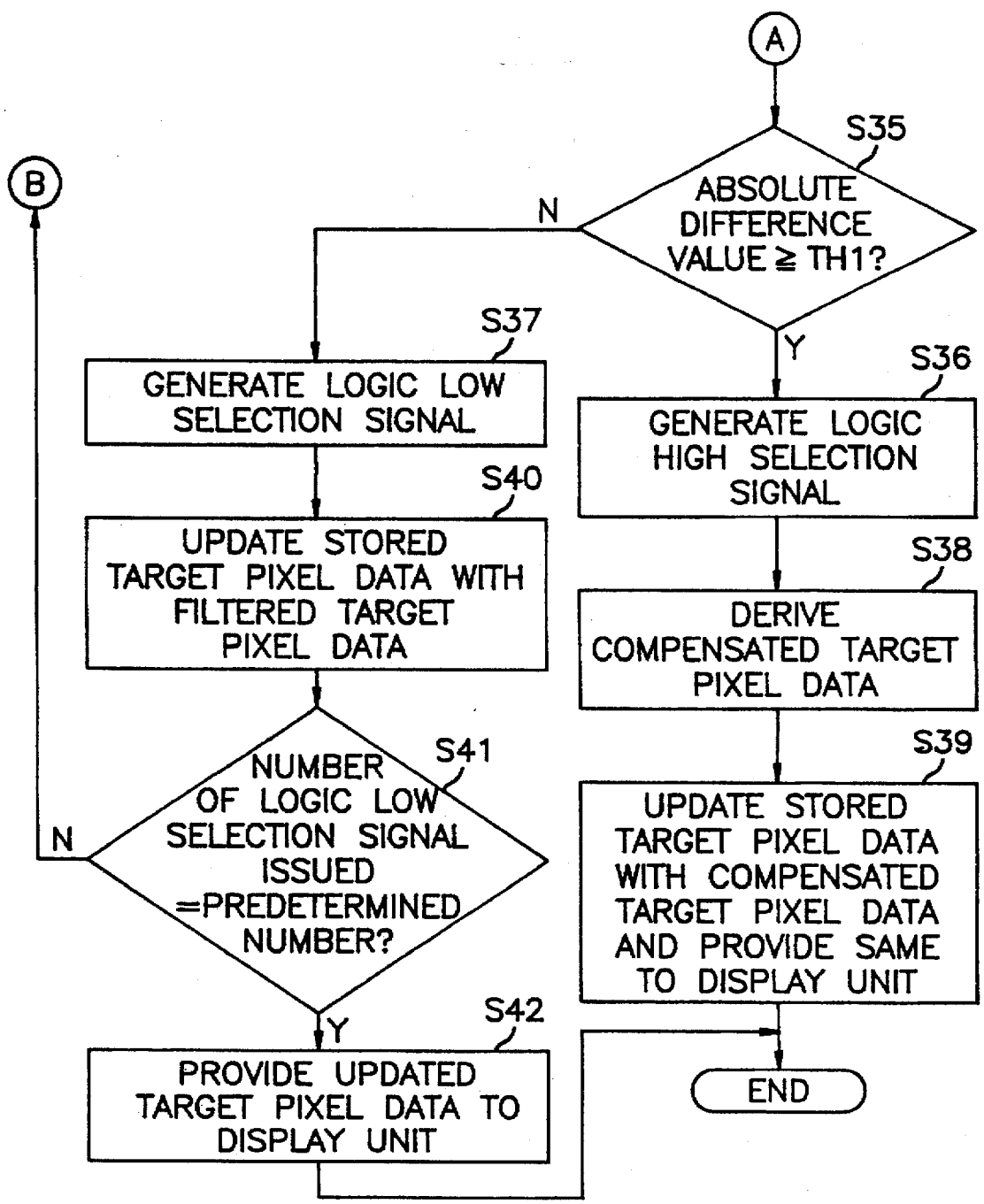

Referring to FIGS. 2, 3A and 3B, there are illustrated details of the post-processing filter apparatus 40 shown in FIG. 1.

The post-processing filter apparatus 40, which comprises a second frame memory 42, a filter 44, a pixel data evaluation device 46, a switching circuit 47, a pixel data correction device 48 and a controller 49, filters the decoded image data of the current frame by processing each of the pixels within the current frame on a pixel-by-pixel basis.

In step S31, the decoded image data of the current frame from the image signal decoder 20 is first stored in the second frame memory 42. In a subsequent step 32, in response to a first control signal from the controller 49, a pixel value of a target pixel is retrieved and provided to a buffer 48a in the pixel data correction device 48, while pixel data for its neighboring N×N, e.g., 3×3, pixels are fed to the filter 44, wherein the target pixel denotes a pixel to be filtered and is located at the center of the N×N pixels with N being a positive integer.

Next, in step S33, the filter 44, which receives the N×N pixel data from the second frame memory 42, performs the filtering thereof with a predetermined cutoff frequency to thereby generate filtered target pixel data. The filter 44 can be implemented by using such a conventional low pass filter as a Median filter or Laplacian filter well known in the art. It should be noted that the predetermined cutoff frequency of the filter 44 can be determined based on the required image quality of the image decoding system. Thereafter, the filtered target pixel data from the filter 44 is supplied to the pixel data evaluation device 46 which contains a difference calculator 46a and a first comparator 46b.

Subsequently, the difference calculator 46a calculates, in step S34, a difference value between the original target pixel data stored in the buffer 48a and the filtered target pixel data from the filter 44 and converts the difference value into its absolute value. The absolute difference value derived at the difference calculator 46a is then applied to the first comparator 46b.

In step S35, the first comparator 46b compares the absolute difference value from the difference calculator 46a with a predetermined threshold value TH1 e.g., prestored in a memory (not shown) thereof, to thereby provide a selection signal SC1 to the switching circuit 47, wherein the threshold value TH1 is a positive integer. That is, the first comparator 46b generates a logic high selection signal in step S36 if the absolute difference value is equal to or larger than the predetermined threshold value TH1; and a logic low selection signal in step S37 if the absolute difference value is smaller than the predetermined threshold value TH1. It should be appreciated that the predetermined threshold value TH1 can be determined based on the required image quality of the image signal decoding system. The logic high or logic low selection signal produced at the first comparator 46b is then fed to the switching circuit 47, a second comparator 48b and the controller 49.

The switching circuit 47, which is responsive to the selection signal SC1 from the first comparator 46b, selectively couples the filtered target pixel data from the filter 44 to the pixel data correction device 48 or the second frame memory 42. Specifically, in response to the logic high selection signal, the filtered target pixel data is coupled to the pixel data correction device 48 which is adapted for correcting the filtered target pixel data; and, in response to the logic low selection signal, the filtered target pixel data is coupled to the second frame memory 42 which is adapted for updating the stored target pixel data with the filtered target pixel data.

As shown in FIG. 2, the pixel data correction device 48 includes the buffer 48a, the second comparator 48b and a pixel data correction circuit 48c. In step S38, the pixel data correction device 48 derives compensated target pixel data; and provides, in step S39, the same to the display unit and the second frame memory 42 wherein the stored target pixel data is updated with the compensated target pixel data. That is, in response to the logic high selection signal SC1, the second comparator 48b compares the filtered target pixel data from the filter 44 via the switching circuit 47 with the original, or non-filtered target pixel data from the buffer 48a and generates a compensation signal LC1. Specifically, the second comparator 48b generates a logic high compensation signal if the non-filtered or original target pixel data is larger than the filtered target pixel data; and a logic low compensation signal if it is smaller than the filtered target pixel data. The generated compensation signal LC1 from the second comparator 48b is provided to the pixel data correction circuit 48c.

The pixel data correction circuit 48c, in response to the compensation signal LC1, provides the compensated target pixel data based on the non-filtered target pixel data from the buffer 48a and the predetermined threshold value TH1 which is identical to the value prestored in the first comparator 46b.

In the preferred embodiment of the present invention, if the input to the pixel data correction circuit 48c is a logic high compensation signal, the compensated target pixel data is obtained by subtracting the predetermined threshold value TH1 from the non-filtered target pixel data; and if the input thereto is a logic low compensation signal, it is derived by adding the non-filtered original target pixel data and the predetermined threshold value TH1.

The controller 49f responsive to the selection signal SC1 from the first comparator 46b, controls filtering process of the target pixel. That is, in response to the logic high selection signal, the controller 49 generates in step S39 a second control signal to the second frame memory 42 to thereby update the stored target pixel data in the memory 42 with the compensated target pixel data from the pixel data correction circuit 48c; and provide from the memory 42 a pixel value for a next target pixel to the buffer 48a and N×N pixel data for the next target pixel to the filter 44 in order to initialize the filtering operation for the next target pixel.

On the other hand, if the first comparator 48b issues the logic low selection signal, the controller 49 generates a third control signal to the memory 42 in order to update the stored target pixel data with the filtered target pixel data from the switching circuit 47 in step S40; and the filtering operation for the target pixel is repeated by providing N×N pixel data including the updated target pixel value from the memory 42 to the filter 44. During the repeated filtering operation for the target pixel, the original target pixel data stored in the buffer 48a is not updated with the filtered target pixel data. The filtering operation for the target pixel is repeated until the first comparator 46b issues the logic high selection signal or the number of the logic low selection signals issued by the first comparator 46b reaches a predetermined number in step S41. In case the number of the logic low selection signals reaches the predetermined number, the controller 49 issues a fourth control signal to the memory 42 to thereby update the stored target pixel data with the filtered target pixel data from the switching circuit 47 and provide the updated target pixel data to the display unit in step S42. Subsequently, the controller 49 provides a fifth control signal to the memory 42 thereby initializing the filtering operation for a next target pixel by providing the next target pixel data to the buffer 48a and corresponding N×N pixel data to the filter 44.

As a result, the present invention is capable of substantially reducing or eliminating a blocking effect present at the boundary of a block of decoded image data by effectively performing post-processing filtering operation, thereby improving the image quality.

While the present invention has been shown and described with reference to the particular embodiments, it will be apparent to those skilled in the art that many changes and modifications may be made without departing from the spirit and scope of the invention as defined in the appended claims.

What is claimed is:

1. A method, for use in an image signal decoding system, for post-processing, on a pixel-by-pixel basis, decoded image data of a current frame from an image signal decoder included in the image signal decoding system, comprising the steps of:

(a) storing the decoded image data of the current frame in a memory;

(b) filtering target pixel data stored in the memory to provide filtered target pixel data, wherein the target pixel data represents a pixel value of a pixel to be filtered;

(c) calculating an absolute difference value between original target pixel data and the filtered target pixel data, wherein the original target pixel data represents non-filtered target pixel data included in the decoded image data;

(d) updating the stored target pixel data with the filtered target pixel data if the absolute difference value is smaller than a predetermined threshold value; and (e) updating the stored target pixel data with compensated target pixel data if the absolute difference value is equal to or larger than the predetermined threshold value, wherein the compensated target pixel data is provided by adding the original target pixel data and the predetermined threshold value if the original target pixel data is smaller than the filtered larger pixel data and by subtracting the predetermined threshold value from the original target pixel data if the original target pixel data is greater than the filtered target pixel data.

2. The method according to claim 1, wherein said filtering step (b) is carried out by using a median filter.

3. The method according to claim 1, further comprising, after said step (d), the step of:

(d1) repeating said steps (b) to (d) N times unless the absolute difference value becomes equal to or larger than the predetermined threshold value, N being a predetermined number.

4. The method according to claim 3, further including, after said step (e), the step of:

(f) repeating said steps (b) to (e) for a next target pixel until all the pixels in the current frame are post-processed.

5. An apparatus, for use in an image signal decoding system, for post-processing, on a pixel-by-pixel basis, decoded image data of a current frame provided from an image signal decoder included in the image signal decoding system, which comprises:

means for storing the decoded image data of the current frame and generating target pixel data from the stored decoded image data, wherein the target pixel data represents the value of a pixel to be filtered;

means for filtering the target pixel data to produce filtered target pixel data;

means for calculating an absolute difference value between original target pixel data and the filtered target pixel data, wherein the original target pixel data denotes non-filtered target pixel data contained in the stored decoded image data;

means for comparing the calculated absolute difference value with a predetermined threshold value;

means for updating the stored target pixel data with the filtered target pixel data if the absolute difference value is smaller than a predetermined threshold value; and means for updating the stored target pixel data with compensated target pixel data if the absolute difference value is equal to or larger than the predetermined threshold value, wherein the compensated target pixel data is derived by adding the original target pixel data and the predetermined threshold value if the original target pixel data is smaller than the filtered target pixel data and by subtracting the predetermined threshold value from the original target pixel data if the original target pixel data is greater than the filtered target pixel data.

6. The apparatus according to claim 5, wherein said filtering means is a median filter.

7. An apparatus, for use in an image signal decoding system, for post-processing, on a pixel-by-pixel basis, decoded image data of a current frame provided from an image signal decoder included in the image signal decoding system, which comprises:

memory means for storing the decoded image data;

means for filtering target pixel data stored in the memory means to provide filtered target pixel data, wherein the target pixel data represents a pixel value of a pixel to be filtered;

means for comparing the filtered target pixel data with original target pixel data, wherein the original target pixel data represents non-filtered target pixel data included in the stored decoded image data; and means for updating the stored target pixel data with the filtered target pixel data if an absolute difference value is smaller than a predetermined threshold value and updating the stored target pixel data with compensated target pixel data if the absolute difference value is equal to or larger than the predetermined threshold value, wherein the absolute difference value represents an absolute difference between the original target pixel data and the filtered target pixel data and the compensated target pixel data is provided by adding the original target pixel data and the predetermined threshold value if the original target pixel data is smaller than the filtered target pixel data and by subtracting the predetermined threshold value from the original target pixel data if the original target pixel data is greater than the filtered target pixel data.

8. The apparatus according to claim 7, wherein said filtering means is a median filter.

9. The apparatus according to claim 7, wherein said comparing means includes means for calculating the absolute difference value.

10. The apparatus according to claim 9, wherein said updating means includes a first comparing means for comparing the absolute difference value with the predetermined threshold value to thereby generate a first selection signal if the absolute difference value is equal to or greater than the predetermined threshold value and a second selection signal if otherwise.

11. The apparatus according to claim 10, wherein said updating means further includes:

a second comparison means for comparing, in response to the first selection signal, the original target pixel data with the filtered target pixel data to thereby provide a first comparison signal if the original target pixel data is smaller than the filtered target pixel data and a second comparison signal if the original target pixel data is greater than the filtered target pixel data;

a pixel data correction means for selectively generating the compensated target pixel data by adding the original target pixel data and the predetermined threshold value in response to the first comparison signal or by subtracting the predetermined threshold value from the original target pixel data in response to the second comparison signal; and a control means for updating the stored target pixel data with the compensated target pixel data in response to the first selection signal and updating the stored target pixel date with the filtered target pixel data in response to the second selection signal.

12. The apparatus according to claim 11, wherein said updating means further includes means for coupling the filtered target pixel data to the second comparison means in response to the first selection signal and to the memory means in response to the second selection signal.

13. The apparatus according to claim 11, wherein said updating means further includes a storage means for storing the original target pixel data.

14. The apparatus according to claim 13, wherein said control means includes means for providing from said memory means the original target pixel data to the storage means and N×N pixel data to the filtering means, N×N pixel data including the stored target pixel data with N being a predetermined positive integer.

15. The apparatus according to claim 14, wherein said control means further includes means for providing the N×N pixel data to the filtering means in response to the second selection signal.

16. The apparatus according to claim 15, wherein said control means provides the N×N pixel data to the filtering means until the number of the second selection signal reaches a predetermined number.

17. The apparatus according to claim 16, wherein said control means further includes means for providing N×N pixel data for a next target pixel to the filtering means if the number of the second selection signal reaches the predetermined number or the first selection signal is applied thereto.

* * * * *